United States Patent

[11] 3,584,652

| [72] | Inventors | Andrew B. Huntington |
| | | Royal Oak; |
| | | Daniel B. Abbott, Farmington, both of, Mich. |
| [21] | Appl. No. | 679,028 |
| [22] | Filed | Oct. 30, 1967 |
| [45] | Patented | June 15, 1971 |
| [73] | Assignee | Ross Operating Valve Company |
| | | Detroit, Mich. |

[54] FLUID PRESSURE AMPLIFYING UNIT
1 Claim, 2 Drawing Figs.

[52] U.S. Cl. .................................................. 137/627.5,
137/596.18, 137/625.66, 137/625.6
[51] Int. Cl. ...................................................... F16k 11/10
[50] Field of Search .......................................... 137/627.5,
102, 115, 596.18, 85, 625.66

[56] References Cited
UNITED STATES PATENTS

| 3,326,239 | 6/1967 | Saint-Joanis | 137/625.27 X |
| 3,442,502 | 5/1969 | Fischer | 137/627.5 UX |
| 3,470,910 | 10/1969 | Loveless | 137/625.6 |
| 2,985,490 | 5/1961 | Gates | 137/102 |
| 2,990,852 | 7/1961 | Siman | 137/627.5 X |
| 3,021,858 | 2/1962 | Kirk | 137/85 |
| 3,105,508 | 10/1963 | Bowditch | 137/102 X |
| 3,107,693 | 10/1963 | Puster | 137/627.5 X |
| 3,252,471 | 5/1966 | Olson | 137/627.5 X |
| 3,354,894 | 11/1967 | Stoll | 137/627.5 X |

*Primary Examiner* — Clarence R. Gordon
*Attorney* — Harness, Dickey & Pierce

ABSTRACT: A diaphragm operated by relatively low signal pressure closes a pilot bleed port and pressure in a piston chamber builds up to operate a closed center crossover main valve, first closing the connection between a working port and exhaust and then opening a connection between the working port and a relatively high supply pressure port, thus providing positive digital output control in a fluid pressure unit.

PATENTED JUN15 1971

3,584,652

INVENTORS
Andrew B. Huntington,
Daniel B. Abbott
BY Harness, Dickey & Pierce
ATTORNEYS

3,584,652

FLUID PRESSURE AMPLIFYING UNIT

BACKGROUND OF THE INVENTION

1. Field of the invention

The invention relates to fluidics, that is, low-pressure systems and more particularly to interface valves between low and high pressure systems. It provides a closed center crossover interface valve in an amplifying unit which gives positive digital output, that is output of a nonproportional or on-off type usable in machinery control and similar applications.

2. Description of the Prior Art

It is known to have amplifying units for controlling relatively high-pressure by means of low-pressure signals. However, the combination of a closed center crossover valve with an amplifying unit as described in this application to obtain on-off output is not presently known.

SUMMARY OF THE INVENTION

Briefly, the illustrated embodiment of the invention comprises a poppet-type of closed center crossover valve operated by a piston, the chamber of which is in turn controlled by a normally open pilot bleed valve. Application of a relatively small signal pressure to a diaphragm will close this valve, causing pressure buildup in the piston chamber ad operating the closed center crossover main valve to shift the working port from an exhaust to a supply condition. Relief of signal pressure will open the pilot bleed valve, exhausting the piston chamber whereupon a spring and fluid pressure will return the main valve to its exhaust position. This results in a compact and reliable amplifier unit which is not susceptible to air contamination and needs no levers or links for its operation in order to achieve positive on-off output control. The range of required minimum signal pressure can be varied by altering the spring strength or by providing an external pilot supply separate from the main valve supply.

DESCRIPTION OF THE PREFERRED EMBODIMENT

Figure 1:
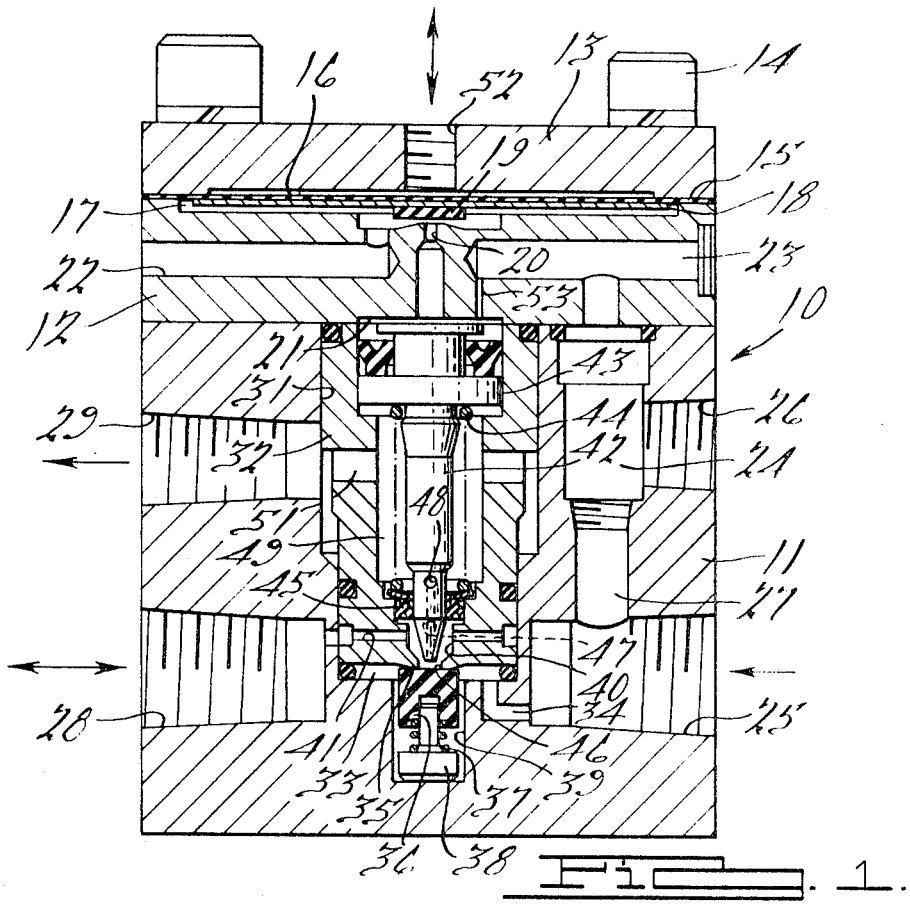
FIG. 1 is a cross-sectional view in elevation of a preferred embodiment of the invention showing the main valve in its exhaust position.

The valve is generally indicated at 10 and comprises a body 11 surmounted by an orifice plate 12, this plate having a cover 13 secured by bolts 14. A diaphragm 15 is secured between plate 12 and cover 13, forming a signal pressure chamber 16 between the diaphragm and cover 13. A bleed chamber 17 is formed between diaphragm 15 and plate 12. A plate 18 is disposed in this chamber and serves to create an effective diaphragm force area.

Diaphragm 15 controls a pilot valve 19 of rubber which opens or closes a bleed port 20 leading from a piston chamber 21 to chamber 17 and thence to a bleed port 22 leading to the atmosphere. Chamber 21 is supplied (via an orifice 53 described below) from a passageway 23 which in turn is supplied from a passageway 24. The latter passageway may be fed either from a supply port 25 in the lower portion of housing 12 or from a separate external pilot supply port 26, in which case the connection 27 between port 25 and passageway 24 would be closed.

Housing 11 is also provided with a working port 28 and an exhaust port 29, these ports as well as supply port 25 leading to a central bore 31 in the housing. More particularly, a insert 32 is secured within bore 31, a supply chamber 33 being formed between the lower end of member 32 and the housing. A passageway 34 leads from port 25 to this chamber. A seat 35 is formed at the lower end of member 32 and a supply valve 36 of a poppet-type engages the seat. The supply valve is urged upwardly by a spring 37 disposed between valve 36 and a member 38 in a recess 39 at the lower end of the housing. Spring 37 may be of a predetermined strength so as to impart the desired closing force to valve 36, which is free to slide downwardly on member 38 against the action of the spring in order to open the supply valve and permit supply pressure to enter a bore 40 in member 32. A radial passage 41 in insert 32 leads from this bore to working port 28.

The means for opening the supply valve comprises an actuator 42 forming an extension of a piston 43 sliding in chamber 21. This piston is urged upwardly in FIG. 1 by a spring 44 which is also of a preselected strength. Extension 42 passes through a seal 45 and when moved downwardly, through a central opening 46 in seat 35, thus pushing supply valve 36 away from seat 35 to open this valve.

An axial passage 47 is provided in extension 42 leading upwardly from the lower end thereof, so that this passage is closed when the lower end of extension 42 engages valve 36 which is made of rubber or a similar material. One of more radial passages 48 extending from the upper end of passage 47 lead to a chamber 49 surrounding extension 42. A radial passage 51 in insert 32 leads from chamber 49 to exhaust port 29. Since, when piston 43 is in its upper position as shown in FIG. 1, the outer end of passage 47 is exposed to bore 40 (connected by passage 41 to working port 28), this will mean that in the upper position working port 28 will be connected to exhaust. When piston 43 moves downwardly, the lower end of passage 47 will first be closed, and thereafter supply valve 36 will be opened. Thus, the construction is of the closed center crossover type, namely, one in which working port 28 is either connected to supply or exhaust, the changeover occurring in a positive or on-off manner. This type of changeover would therefore be usable for nonproportional or digital output purposes such as in the control of machines.

In operation, port 25 will be provided with relatively high supply pressure, and a signal port 52 is provided in cover 13 which is connected to chamber 16. Piston chamber 21 is connected to passageway 23 by a very narrow orifice 53, this orifice being smaller than opening 20. Therefore, with valve 18 in the upper position as shown in FIG. 1, chamber 21 will be effectively connected to exhaust. Piston 43 will be in its upper position with working port 28 also connected to exhaust. Application of a relatively low signal pressure at port 52 will close bleed port 20 and the pressure in chamber 21 will rapidly build up through orifice 53. This pressure will overcome the force of spring 44 and pistons 43 will move downwardly, closing the lower end of passage 47 as it engages valve 36. Further downward movement of piston 43 against the action of springs 44 and 37 as well as the supply pressure tending to close valve 36, will cause valve 36 to be lifted from seat 35. Pressure will thus be supplied to working port 28.

Upon release of signal pressure at port 52, the pressure in opening 20 will cause valve 18 to open and chamber 21 will be exhausted through bleed 22 more rapidly than it can be supplied through orifice 53. Springs 37 and 44 assisted by the fluid pressure acting on the lower end of extension 42 will thus return piston 43 to its upper position, closing supply valve 36 and opening working port 28 to exhaust through passages 47 and 48.

Figure 2:
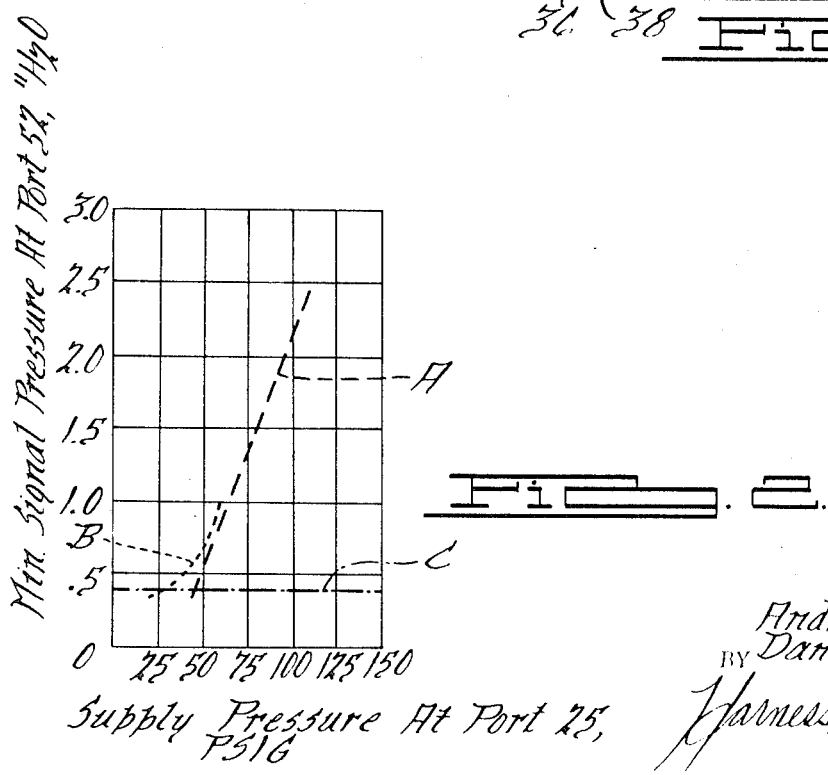
FIG. 2 is a chart showing the ranges of minimum signal pressure for various inlet pressures as controlled by changes in return spring strength or by the provision of an external pilot supply.

It should be observed that the signal pressure necessary at port 52 to operate the main valve will depend on the strength of springs 37 and 44 as well as the supply pressure, since the latter will act at bleed port 20 against the diaphragm. FIG. 2 shows three illustrative curves in which the minimum signal pressure required, in inches of water, is plotted against the actual inlet pressure in pounds per square inch gauge. For example, curve A shows that with a given set of springs 37 and 44, and inlet pressure of 75 p.s.i.g., it would take a minimum signal pressure of about 1.3 inches of water to operate the valve in a positive manner. If the inlet pressure is 100 p.s.i.g., it would take a minimum signal pressure of about 2.2 inches of water. If the inlet pressure were too low, say less than about 40 p.s.i.g., it would be insufficient to overcome the springs, and if it were too high, above about 110 p.s.i.g., the springs could not overcome that proportion of the inlet pressure in chamber 21 which exists when bleed port 20 is connected to bleed port 22, it being kept in mind that chamber 21 is continuously supplied with fluid through orifice 53.

Curve B shows the range of minimum signal pressures for a different set of springs which are weaker than those used for curve A. With weaker springs, the device could operate in a positive manner with lower inlet pressures, say down to about 24 p.s.i.g., and up to inlet pressures of about 60 p.s.i.g. It will be noted that curves A and B will overlap so that by choosing the proper spring strengths, the device could be operated over a wide variety of minimum signal pressures.

Curve C indicates the minimum signal pressure required for a hookup in which chamber 21 is supplied from a separate or external pilot supply source going through port 26. In this case, since the diaphragm is unaffected by the supply pressure at port 25, the same minimum signal pressure will be required regardless of this supply pressure. For a proper spring strength this could be about 0.3 inches of water.

It will be noted that the invention eliminates the need for levers or other extraneous actuators in order to achieve a digital output control from a very low signal source.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What I claim is:

1. In a pressure-amplifying unit, a closed center crossover main valve assembly movable between the supply position and an exhaust position, a supply port for said main valve assembly, a working port connected to said supply port when said main valve assembly is in it supply position, an exhaust port for said main valve assembly, said working port being connected to said exhaust port when the main valve assembly is in its exhaust position, a supply valve disposed between said supply and working ports, resilient means urging said supply valve to its closed position, a piston for moving said main valve assembly to its supply position, an exhaust valve carried by an extension on said piston and disposed between said working and exhaust ports, said exhaust valve closing by engagement with said supply valve when said piston is extended, whereby it is assured that said working port is disconnected from said exhaust port before being connected to said supply port, resilient means for retracting said piston, means for supplying fluid pressure through an orifice to said piston, a bleed connection for said piston having a cross secton substantially larger than said orifice, whereby said piston will be effectively connected to exhaust a free floating diaphragm and a plate forming a flat low-pressure signal chamber with a relatively small volume, a pilot valve movable with said diaphragm and responsive to pressure in the diaphragm chamber to close said bleed connection, whereby pressure supplied to said piston through said orifice will cause said main valve assembly to move from its exhaust to its supply position, said main valve assembly comprising a valve body having a central bore, said supply valve being of rubberlike material coaxial with said piston and spring urged toward the piston, said supply port being connected to the portion of said bore containing said supply valve, an insert in said valve body bore having an annular seat engageable by said supply valve, said extension on said piston passing through said annular seat when said piston is actuated by fluid pressure, said exhaust valve comprising a central axial passage in said extension opening toward said supply valve member and engageable therewith when the piston is so moved to close said central passage, said working port being connected to a central bore in said insert through which said extension passes, whereby said central passage will be connected with said working port when said piston is retracted, a chamber surrounding said piston extension, a seal separating said last-mentioned chamber from said bore connected to the working port, and a radial passage in said piston extension connecting said axial passage to said last-mentioned chamber, said exhaust port being connected to said last-mentioned chamber, whereby said working port will be connected to said exhaust port when the piston is retracted.

UNITED STATES PATENT OFFICE
CERTIFICATE OF CORRECTION

Patent No. 3,584,652            Dated June 15, 1971

Inventor(s) Andrew B. Huntington and Daniel B. Abbott

It is certified that error appears in the above-identified patent and that said Letters Patent are hereby corrected as shown below:

Abstract, last line, after "pressure" insert --amplifying--. Column 1, line 26, "ad" should be --an--; line 34, "to" should be --no--. Column 2, line 21, "of" should be --or--; line 25, "outer" should be --other--; and line 42, "the" should be --its--.

Signed and sealed this 7th day of December 1971.

(SEAL)
Attest:

EDWARD M. FLETCHER, JR.      ROBERT GOTTSCHALK
Attesting Officer                Acting Commissioner of Patents